No. 633,797. Patented Sept. 26, 1899.
R. B. CANTRELL.
ARTIFICIAL BAIT.
(Application filed Nov. 25, 1898.)

(No Model.)

WITNESSES:
J. W. Himan
Peter N. Ross

INVENTOR
Robert B. Cantrell
BY
Henry Connett
ATTORNEY

UNITED STATES PATENT OFFICE.

ROBERT B. CANTRELL, OF NEW YORK, N. Y.

ARTIFICIAL BAIT.

SPECIFICATION forming part of Letters Patent No. 633,797, dated September 26, 1899.

Application filed November 25, 1898. Serial No. 697,309. (No model.)

*To all whom it may concern:*

Be it known that I, ROBERT B. CANTRELL, a citizen of the United States, residing in the city of New York, borough of Brooklyn, in the county of Kings and State of New York, have invented certain new and useful Improvements in Artificial Baits, of which the following is a specification.

This invention relates to that class of artificial baits used by anglers, which simulate winged insects and which are called "flies," and which may be detached from the hook. Ordinarily these flies are tied directly upon the hook, and consist of tinsel, silk, chenille, feathers, &c., or tied upon wires to be secured at the side of a special hook with a flattened shank. There are several objections to this procedure. In the first place it is not convenient to wrap the materials on the shank of the fish-hook, because of the point and barb of the hook being in the way. Then the fly, which is sometimes quite expensive, is often destroyed or seriously damaged by the fish or in removing the hook from its mouth, and, furthermore, where the fly is built on the hook it cannot, of course, be shifted to another hook in case the hook it is on should be broken or injured. Such flies also occupy much space in the fly-book and necessitate a relatively large and cumbrous book. It is also very desirable that the fly shall be tied in such a manner that it may be readily mounted on ordinary hooks with attached snells, such as are found in stores where anglers' goods are sold, and not limited to a special form of hook, and that the fly shall not be so mounted on the shank of the hook as to leave the latter exposed.

To overcome these defects is the object of the present invention, which consists in forming the fly on a tube, so that when finished it is independent of the hook, but may be slipped over the shank of the hook, which it fits snugly and rather tightly, but so that it may be removed by slipping it off over the snell or back on the line.

In the accompanying drawings several embodiments of the invention are illustrated.

Figure 1:
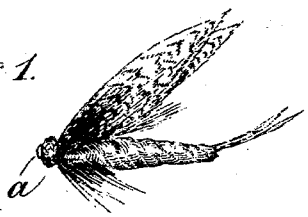
Figure 2:
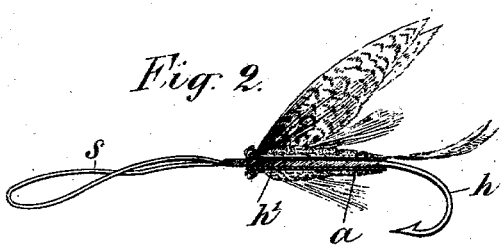
Figure 3:
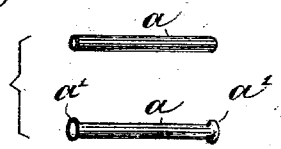
Figure 4:
Figure 5:
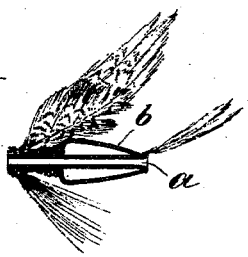

Figure 1 is a side view of a detachable fly constructed according to my invention. Fig. 2 is a longitudinal axial section of the same, showing the fly on the hook. Fig. 3 shows two kinds of tubes adapted to form cores on which the flies are wrapped or formed. Figs. 4 and 5 illustrate modified constructions of the fly, which will be hereinafter described.

In carrying out my invention in its preferred form I take a slender tube $a$, of any suitable material, such as aluminium or other thin metal, celluloid, and the like. On this tube I tie in the usual way the materials which are to form the fly. The materials commonly employed are so various that it will not be necessary to attempt any enumeration of them, and the manner of using them in constructing the fly is well known to those skilled in the art. The fly when completed will ordinarily appear somewhat as illustrated in Fig. 1, and it may be slipped over the snell and onto the shank $h'$ of the hook $h$, as indicated in Fig. 2. The tube $a$ should be of such a caliber that it will fit snugly on the shank of the hook, which is usually wrapped in fixing to it the snell $s$. The fly should be removable, but should not be loose on the hook so as to rotate or slip back on the line except when some little force is applied.

The tube $a$ may have a slight flange or flare at its ends, as indicated at $a'$ on the lower tube in Fig. 3, for convenience in holding the materials in place thereon.

Fig. 4 shows how the tube $a$ itself may form the ornamental body of the fly. In this case the tube may be striped or ornamented with colors, gilt, &c., and will not be covered with fibrous material.

Fig. 5, which is a sectional view, shows how a bulbous light body $b$ may be slipped onto the tube $a$, and this body may be decorated in any manner desired to imitate the body of an insect.

It will be noted that in any case the fly is tied on the tube and not on the hook, that the ordinary hook with snell attached may be used, and that the tube wholly incloses and hides the shank of the hook. While such a fly is readily removable, it cannot by any possibility become detached from the hook in casting.

The fly may be slipped back on the line when removing the hook from the mouth of the fish, and it is free, indeed, to be thus pushed back by the fish in taking the hook. The tying of the fly on a tube facilitates the tying by machinery, as the tube may be readily slipped on the spindle in a lathe, so that it can be rapidly rotated about its axis and the materials thus wound about it.

Having thus described my invention, I claim—

1. An artificial bait in the nature of a fly, consisting of a light tube, having the fly tied thereon, said tube being adapted to fit removably but not rotatively over the shank of the hook, whereby the snell may be threaded through the tube and the latter made to inclose the said shank, substantially as set forth.

2. An artificial bait in the nature of a fly, consisting of a light, slender tube extending longitudinally of the body of the fly and covered with the materials forming the fly, said materials being tied upon and concealing said tube, substantially as set forth.

3. The combination with a fish-hook and snell, of a fly on the hook, comprising a slender, light tube which incloses removably the shank of the hook, and the usual materials which form an artificial fly tied on and covering said tube, substantially as set forth.

In witness whereof I have hereunto signed my name, this 19th day of November, 1898, in the presence of two subscribing witnesses.

ROBERT B. CANTRELL.

Witnesses:
PETER A. ROSS,
HENRY CONNETT.